(12) United States Patent
Falkebo et al.

(10) Patent No.: US 8,732,143 B2
(45) Date of Patent: May 20, 2014

(54) REDUCING LOCKING DURING DATABASE TRANSACTIONS

(75) Inventors: Jesper Lau Falkebo, Bunkeflostrand (SE); Thomas Hejlsberg, Horsholm (DK)

(73) Assignee: Microsoft Corporation, Redmond, WA (US)

( * ) Notice: Subject to any disclaimer, the term of this patent is extended or adjusted under 35 U.S.C. 154(b) by 223 days.

(21) Appl. No.: 12/869,747

(22) Filed: Aug. 27, 2010

(65) Prior Publication Data

US 2012/0054164 A1  Mar. 1, 2012

(51) Int. Cl.
*G06F 17/30* (2006.01)

(52) U.S. Cl.
USPC .......................................... 707/704; 707/759

(58) Field of Classification Search
USPC .................................. 707/634, 704
See application file for complete search history.

(56) References Cited

U.S. PATENT DOCUMENTS

| | | | |
|---|---|---|---|
| 5,524,241 A | | 6/1996 | Ghoneimy et al. |
| 6,275,863 B1 | | 8/2001 | Leff et al. |
| 7,251,669 B1 | * | 7/2007 | Arora ........................... 707/695 |
| 7,640,242 B2 | * | 12/2009 | Chatterjee et al. .................... 1/1 |
| 2005/0261914 A1 | * | 11/2005 | Brookins ........................... 705/1 |
| 2006/0294057 A1 | * | 12/2006 | Childress et al. ................. 707/2 |
| 2007/0239798 A1 | | 10/2007 | Shringi et al. |
| 2008/0228834 A1 | * | 9/2008 | Burchall et al. .............. 707/202 |

OTHER PUBLICATIONS

Smart, John Ferguson, "Speed Up Your Hibernate Applications with Second-Level Caching", Retrieved at <<http://www.devx.com/dbzone/Article/29685>>, Nov. 3, 2005, pp. 4.
"Transactions and Concurrency", Retrieved at <<http://docs.jboss.org/hibernate/core/3.3/reference/en/html/transactions.html>>, Apr. 20, 2010, pp. 15.
Meier, J.D., "Improving SQL Server Performance", Retrieved at <<http://msdn.microsoft.com/en-us/library/ms998577.aspx>>, May 2004, pp. 32.

\* cited by examiner

*Primary Examiner* — Rehana Perveen
*Assistant Examiner* — Alexander Khong
(74) *Attorney, Agent, or Firm* — Damon Rieth; Jim Ross; Micky Minhas (57) ABSTRACT

Concepts and technologies are described herein for reducing locking during database transactions without using a cache. In accordance with the concepts and technologies disclosed herein, a server application generates a changeset in response to receiving an operation for modifying base data stored in a database. The changeset is stored as a set of tables that are stored at the database with the base data, and include a first table reflecting records in the base data that have been created and/or modified by the operations. The changeset further can include a second table reflecting records in the base data that have been deleted by the operations.

15 Claims, 4 Drawing Sheets

FIG. 3

REDUCING LOCKING DURING DATABASE TRANSACTIONS

BACKGROUND

When data in a database is updated by a device or application, the data in the database is locked until the device or application making the changes to the data releases the data or terminates a session with the database. Locking of the data in a database may affect performance of the database and/or devices and applications connected thereto. Additionally, while the data in the database is locked, other devices and/or applications may be unable to access or make changes to the data.

The issue of locking is particularly pronounced during long-running transactions and/or for databases where a number of users, applications, or devices are authorized to access the data. Other long-running transactions include instances wherein multiple queries and/or modifications to the same data are made in succession and/or when numerous and/or complex computations on the data are executed by a device or application accessing the data. In these and other cases, the devices and/or applications modifying the data may perform various calculations and/or operations on the data while the data is locked, thereby preventing access to the data by other applications and/or devices.

One attempt at mitigating problems caused by data locking involves the use of a cache holding all changes at the device accessing the data in the database. Changes to the data are cached at the device instead of the data being locked. When the device is ready to commit the changes to the database, the data is locked and the changes are submitted at one time. Caching changes requires additional computational resources at the devices, however, as the devices must perform post-processing operations on query results to reflect changes cached at the device. These post-processing steps can become extremely complex depending upon the number of changes cached at the devices, and where numerous computations build on each other, may degrade performance of the devices.

It is with respect to these and other considerations that the disclosure made herein is presented.

SUMMARY

Concepts and technologies are described herein for reducing locking of data during database transactions without using a device cache or post-processing operations at the devices. In accordance with the concepts and technologies disclosed herein, a server application generates a changeset in response to executing an operation modifying base data stored in a database. The changeset is stored as a set of tables within the database with the base data. The set of tables can include a first table that stores data reflecting records in the base data that have been created and/or modified by the operations, and a second table stores data reflecting records in the base data that have been deleted by the operations.

Prior to committing changes, additions, and/or deletions reflected in the changeset to the base data, queries received at a server computer hosting the server application are modified to include statements for querying data stored in the changeset as well as the base data. The modified queries are executed on the base data and the changeset, and results satisfying the modified queries are generated and returned to the requesting devices and/or entities. Generation of the changeset and the modified queries, as well as execution of the modified queries, can occur without locking the base data. Thus, some embodiments allow devices and/or applications to access the base data while other devices and/or applications modify the base data.

When the device submitting the operations to the server application ends a transaction with the server computer, the server application locks the base data. The server application applies the changes stored in the changeset tables to the base data in succession. When the changes stored in the changeset tables have been applied to the base data, the base data is unlocked, and the changeset is discarded.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to concepts and technologies for reducing locking during database transactions without using a device cache or post-processing operations at the devices. In accordance with the concepts and technologies disclosed herein, a server application generates a changeset in response to receiving an operation for modifying base data stored in a database. The changeset is stored as a set of tables that are stored at the database with the base data. The set of tables can include a first table that stores data reflecting records in the base data that have been created and/or modified by the operations, and a second table stores data reflecting records in the base data that have been deleted by the operations.

Prior to committing changes, additions, and/or deletions reflected in the changeset to the base data, queries received at a server computer hosting the server application are modified to include statements for querying data stored in the changeset as well as the base data. The modified queries are executed on the base data and the changeset, and results satisfying the modified queries are generated and returned to the requesting devices and/or entities. Generation of the changeset and the modified queries, as well as execution of the modified queries, can occur without locking the base data. Thus, some embodiments allow devices and/or applications to access the base data while other devices and/or applications modify the base data.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for reducing locking during database transactions will be presented.

Figure 1:
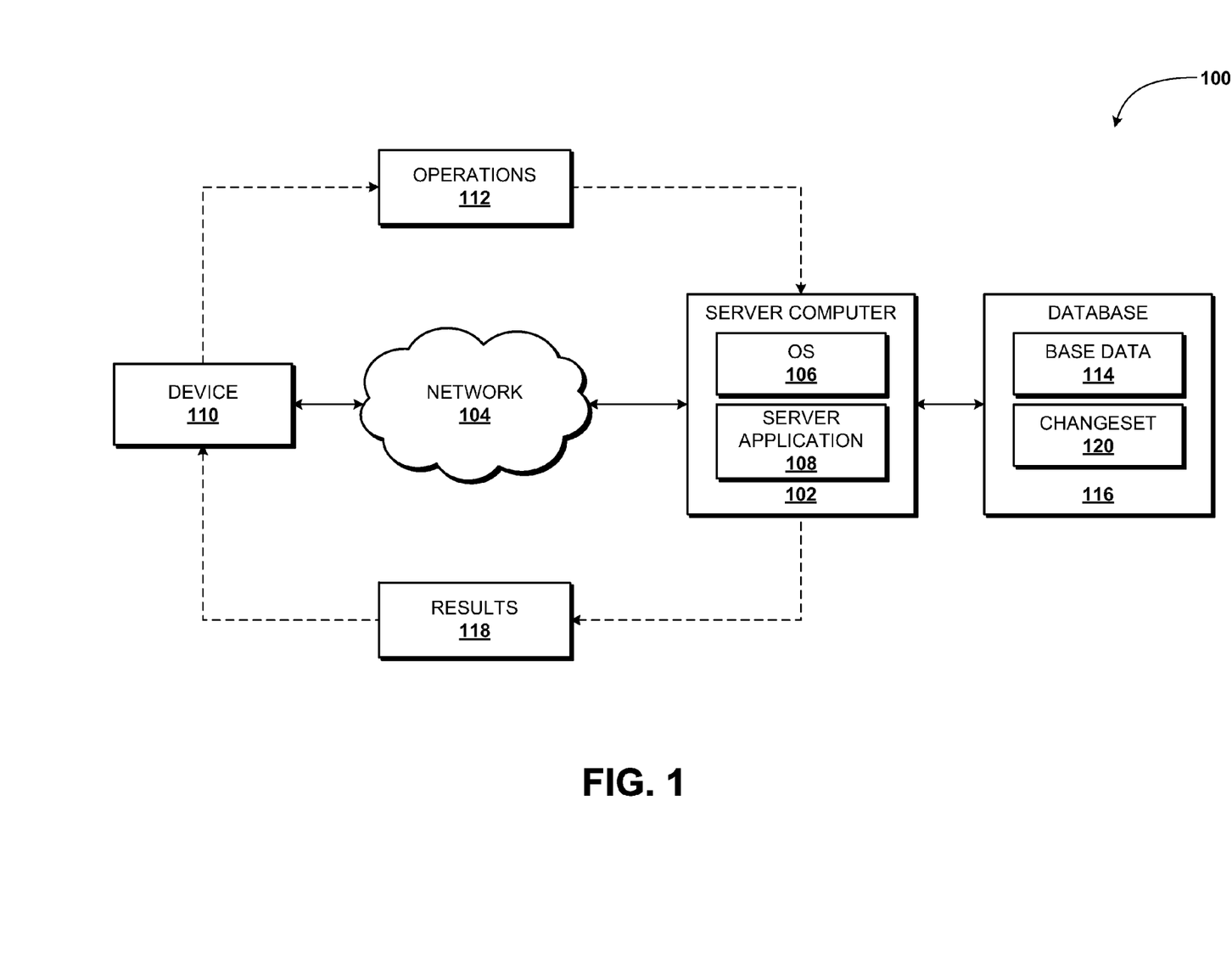
FIG. 1 is a system diagram illustrating an exemplary operating environment for the various embodiments disclosed herein.

Referring now to FIG. 1, aspects of one operating environment 100 for the various embodiments presented herein will be described. The operating environment 100 shown in FIG. 1 includes a server computer 102 operating on or in communication with a network 104. The functionality of the server computer 102 can be provided by one or more server computers, desktop computers, mobile telephones, laptop computers, other computing systems, and the like.

The server computer 102 is configured to execute an operating system 106 and one or more application programs such as a server application 108. The operating system 106 is a computer program for controlling the operation of the server computer 102. The server application 108 is an application program configured to execute on top of the operating system 106 to provide the functionality described herein for reducing locking during database transactions.

According to various embodiments, the operating environment 100 further includes one or more devices 110 operating in communication with the network 104 and/or the server computer 102. In some implementations, the devices 110 include one or more personal computers ("PCs") such as desktop, tablet, or laptop computer systems. The devices 110 also may include other types of computing systems including, but not limited to, server computers, handheld computers, netbook computers, embedded computer systems, personal digital assistants, mobile telephones, smart phones, and the like.

The server application 108 is configured to receive operations 112 generated by one or more of the devices 110, to access base data 114 hosted at one or more databases 116 accessible to the server computer 102 in response to the operations 112, and to take action with respect to the base data 114 based upon the operations 112, as is described herein. According to various embodiments, the operations 112 can include queries for reading the base data 114 or modifications for modifying the base data 114. In some embodiments, the operations 112 include one or more structured query language ("SQL") operations generated by the device 110.

More particularly, in some embodiments, the operations 112 include one or more queries for reading from the base data 114 one or more records that satisfy criteria specified in the query. The server application 108 is configured to generate one or more results 118 that satisfy the queries, and to provide the results 118 to the device 110 as responses to the queries. In other embodiments, the operations 112 include one or more modifications to the base data 114. "Modifications" of the base data 114 are not limited to changing or modifying the base data 114, and instead is used expansively to refer to creation or addition of one or more records to the base data 114, modification of one or more records of the base data 114, and/or deletion of one or more records of the base data 114.

Updating of database data often requires that the data being updated be locked before changes are made. These locks may create performance and accuracy problems for other users or devices accessing the data stored in the database. For example, the locking may prevent other devices and/or users from accessing the data until the data is released. For long-running transactions in particular, these locks can create other issues such as conflicts, deadlocks, and the like.

According to various embodiments disclosed herein, the server application 108 is configured to generate a changeset 120 when modifications are received instead of immediately applying the changes to the base data 114. Thus, the server application 108 does not lock the base data 114 during modifications of the base data 114 by the devices 110. According to some implementations, the changeset 120 includes one or more tables for storing data corresponding to modifications requested via the operations 112. As will be explained in more detail herein, in various embodiments there is only one set of base data 114, though there may be one or many changesets 120. In particular, each device 110 communicating with the server computer 102 can generate and conduct operations on a changeset 120 that is private to that particular device 110 and/or not shared or visible to other devices 110. The server application 108 uses the changeset 120 to supplement other queries received by the sever computer 102 before the changes reflected in the changeset 120 are committed to the base data 114. It therefore should be understood that a number of devices 110 can simultaneously interact with the server computer 102 and interact with respective changesets 120. Thus, the devices 110 and may receive different results in response to identical or similar queries based upon the contents of respective changesets 120 associated with the devices 110.

The server application 108 also is configured to modify received queries to access data stored in the changeset 120. More particularly, the server application 108 is configured to modify queries relating to the base data 114 to include statements for querying the changeset 120. The server application 108 executes the modified queries and outputs the results 118 to devices 110 that submit the original queries. It should be understood that the queries can originate from other devices, nodes, or even server logic, and not necessarily from the device 110. For example, in some embodiments the server computer 102 operates as a client to itself and generates the queries with server logic. Other embodiments are possible and are contemplated. Thus, the illustrated and described embodiments should be understood as being exemplary, and should not be construed as being limiting in any way. In some embodiments, the server application 108 modifies the query received as the operation 112 by generating one or more queries relating to the changeset 120, and joining the queries using a UNION operand, for example. These and other features of the server application 108 will be further understood with reference to FIGS. 2-3 below.

According to various embodiments, the server application 108 also is configured to determine when all queries and modifications have been received. For example, the server application 108 may receive a command from a device 110 to commit all changes made by the device 110. Additionally, or alternatively, the device 110 may terminate a transaction with the server computer 102, and/or the server application 108 may determine that a time or operation quota has been met, and may terminate a transaction originated from the device 110.

According to various embodiments, the server application 108 is configured to apply all changes in the changeset 120 to the base data 114 when the server application determines that the transaction between the server computer 102 and the device 110 has ended. Because all query modifications, updating of the base data 114, and computations relating to the modified queries are conducted on the server computer 102, the devices 110 can be relieved of processing and post-processing operations that otherwise may degrade performance of the device 110 and/or lengthen the time for which the base data 114 is locked during updating. As such, embodiments allow for reduced data locking during database transactions.

FIG. 1 illustrates one server computer 102, one network 104, one device 110, and one database 116. It should be understood, however, that some implementations of the operating environment 100 include multiple server computers 102, multiple networks 104, multiple devices 110, and/or multiple databases 116. Thus, the illustrated embodiments should be understood as being exemplary, and should not be construed as being limiting in any way.

Figure 2:
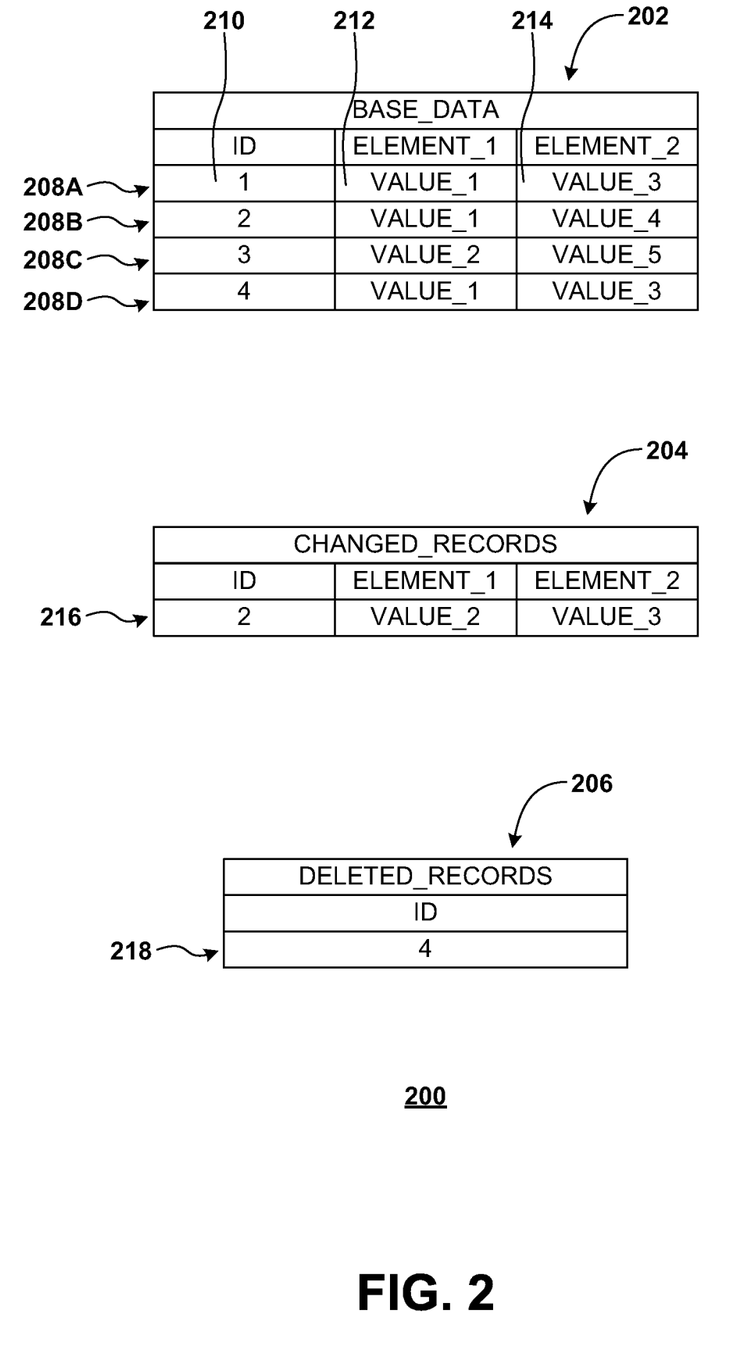
FIG. 2 is a block diagram that schematically illustrates a data structure for storing the base data and the changeset, according to an exemplary embodiment.

Turning now to FIG. 2, additional aspects of the base data 114 and the changeset 120 will be described in detail. More particularly, FIG. 2 is a block diagram schematically illustrating a data structure 200 for the base data 114 and the changeset 120, according to an exemplary embodiment. As illustrated in FIG. 2, the data structure 200 includes a base data table 202 for storing the base data 114, and two tables; a changed record table 204 and a deleted records table 206, for storing data indicating changes to be made to the base data 114.

The base data table 202 includes records 208A-D, each of which includes a field 210 for storing a record identifier ("record ID") to function as the primary key of the base data table 202, and one or more fields for storing data associated with the record 208. In the illustrated embodiment, each record 208 includes a field 212 for storing a value for a first element, and a field 214 for storing a value for a second element. It should be understood that the base data table 202 can include fewer or more columns, rows, and/or fields than the illustrated base data table 202. As such, the illustrated base data table 202 and the contents thereof should be understood to be illustrative, and should not be construed as being limiting in any way.

According to various embodiments disclosed herein, the server application 108 is configured to generate the changed records table 204 and the deleted records table 206 upon receiving an operation 112 for modifying the base data 114 stored at the database 116. The changed records table 204 and the deleted records table 206 are used to store changes made to the base data 114 instead of locking the base data 114 and updating the base data 114 upon receiving the modifications. Thus, the server application 108 is configured to reduce and/or avoid data locks associated with database transactions until all of the transactions are complete. For long-running transactions and/or strings of transactions, these embodiments can substantially reduce the amount of locking required to implement updates to the base data 114.

Instead of locking the base data 114 during updating by a user or device associated with the operations 112, the server application 108 stores the changes in the changeset 120 until the user or device ends the transaction with the server computer 102. When the user or device ends the transaction with the server computer 102, the server application 108 locks the base data 114 and submits all of the changes reflected in the changeset 120 at one time, thereby reducing or eliminating any unnecessary locking of the base data 114. In some embodiments, the server application 108 is configured to discard the changeset 120 if a transaction between a user or device and the server computer 102 is aborted. Furthermore in some embodiments, the changes reflected in the changeset 120 are persisted in a sorted manner to avoid deadlocks.

During the transaction, the server application 108 is configured to satisfy queries submitted to the server computer 102 based not only upon the base data 114, but also upon data included the changeset 120. As mentioned above, modification of the queries and execution of the queries is performed by the server application 108. Thus, the server application 108 is configured to allow the devices 110 to avoid post-processing of the results 118 to reflect changes made during a transaction, as explained above. This ability can improve performance of the devices 110, the server computer 102, the database 116, and can reduce the amount of time during which the base data 114 is locked to accommodate updating of the base data 114.

According to some embodiments, as illustrated in FIG. 2, the changed records table 204 has the same layout as the base data table 202. The changed records table 204 stores data corresponding to records 208 of the base data table 202 that have been changed via the operations 112. In the illustrated example, the changed records table 204 stores a record 216 that indicates a change made to the record 208B of the base data table 202. As illustrated in FIG. 2, one or more of the records 208 stored in the base data table 202 can be correlated to one or more of the records 216 stored in the changed data table 204 based upon record ID data stored in the respective tables 202, 204.

The deleted records table 206 stores data that identifies records 208 of the base data table 202 that have been deleted via the operations 112. According to various embodiments, the deleted records table 206 does not have the same layout as the base data table 202 and/or the changed records table 204, though this is not necessarily the case. In the illustrated embodiment, the deleted records table 206 includes one record 218, which indicates that the record 208D of the base data table 202 has been deleted via the operations 112.

The use of the base data table 202, the changed records table 204, and the deleted records table 206 can be understood by considering some brief examples. If a query for records with "Value_2" as the value for "Element_1" is performed by the server application 108 solely upon the base data table 202, the query will return the record corresponding to the record ID "3." As illustrated in the changed data table 204, however, a query for records with "Value_2" as the value for "Element_1" that is performed on the base data table 202 and the changed records table 204 will return the records corresponding to the record IDs "2" and "3."

Similarly, if a query for records with "Value_3" for "Element_2" is performed by the server application 108 solely upon the base data table 202, the query will return the records corresponding to the record IDs "1" and "4." If, however, a query for records with "Value_3" for "Element_2" is performed by the server application 108 on the base data table 202 and the deleted records table 206, the query will return only the record corresponding to the record ID "1." These queries are exemplary and are provided solely to illustrated the concepts and technologies disclosed herein. Thus, these examples should not be construed as being limiting in any way.

Figure 3:
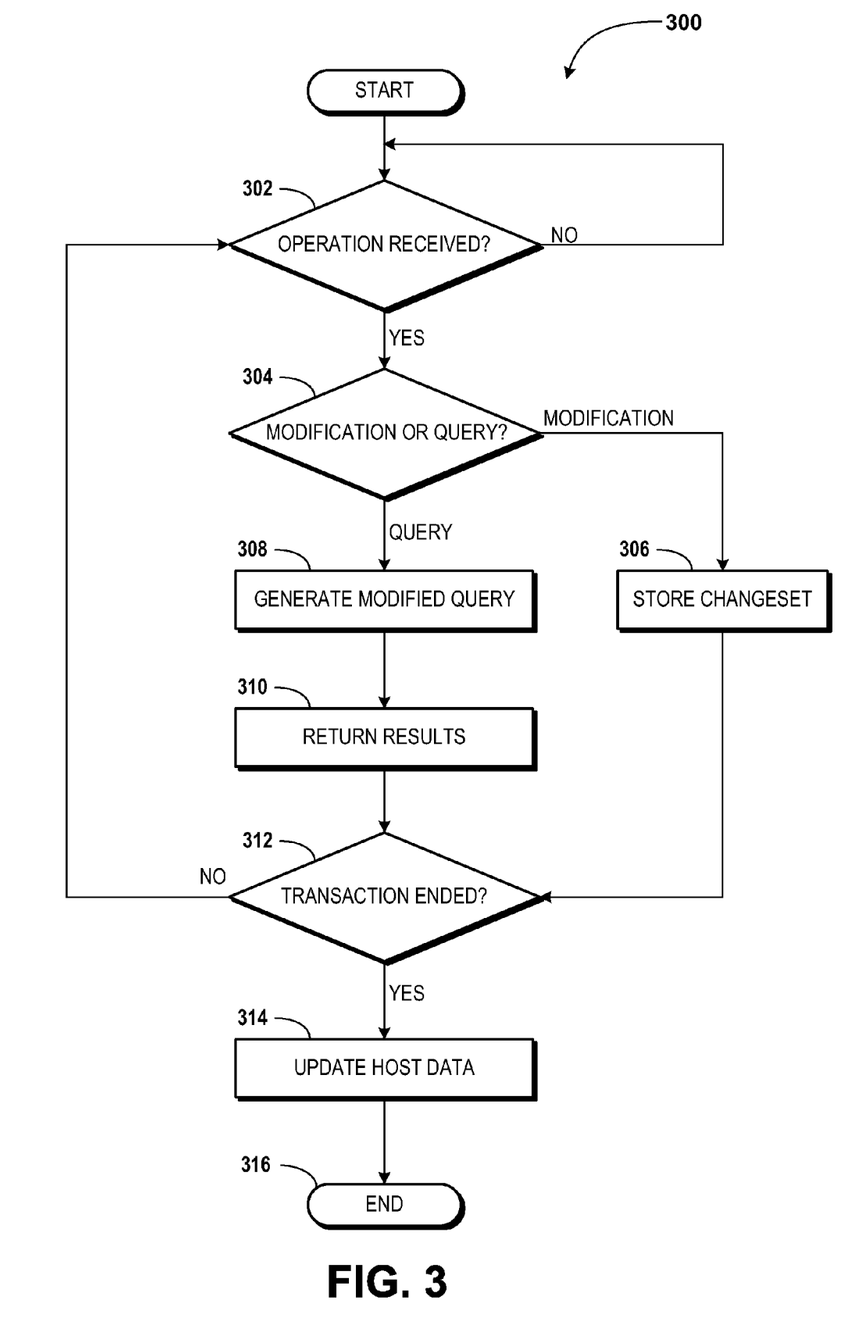
FIG. 3 is a flow diagram that schematically illustrates aspects of a method for updating data stored in a database, according to an exemplary embodiment.

Turning now to FIG. 3, aspects of a method 300 for updating a database will be described in detail. It should be understood that the operations of the method 300 disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated method 300 can be ended at any time and need not be performed in its entirety. Some or all operations of the method 300, and/or substantially equivalent operations, can be performed by execution of computer-readable instructions included on a computer-storage media, as defined above. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the method 300 disclosed herein is described as being performed by a server application 108 executed by the server computer 102. It should be understood that this embodiment is exemplary, and should not be viewed as being limiting in any way. Additional and/or alternative applications can be executed by the server computer 102 and/or other devices to provide the functionality disclosed herein without departing from the scope of the appended claims.

The method 300 begins at operation 302, wherein the server computer 102 determines if an operation 112 has been received at the server computer 102. According to some embodiments, the method 300 does not proceed past operation 302 until the server computer 102 determines that an operation 112 has been received by the server computer 102. If the server computer 102 determines that an operation 112 has been received, the method 300 proceeds to operation 304.

At operation 304, the server computer 102 determines if the received operation 112 corresponds to a modification of the base data 114 or a query relating to the base data 114. If the operation 112 corresponds to a modification of the base data 114, the method 300 proceeds to operation 306, wherein the server computer 102 stores data indicating the modification. The server computer 102 stores the data indicating the modification as a changeset 120 describing the modification requested via the operation 112.

As explained above with reference to FIGS. 1-2, the data stored in the changeset 120 can be stored in one or more tables that are associated with the base data 114. In some embodiments, the changeset 120 includes data stored in a changed records table 204 and a deleted records table 206. The changeset 120 can be stored at the database 116 with the base data 114, and can be used by the server computer 102 to satisfy queries relating to the base data 114.

If the server computer 102 determines at operation 304 that the operation 112 received in operation 302 corresponds to a query, the method 300 proceeds to operation 308, wherein the server computer 102 generates a modified query based upon the received query. As explained above with reference to FIGS. 1-2, the server application 108 is configured to generate the modified query by supplementing the query for the base data 114 with a query for data from the changeset 120.

In one exemplary embodiment, the server application 108 supplements a select statement for data from the base data 114 with one or more statements for data from the changeset 120. Referring to the tables illustrated in FIG. 2, the server application 108 will replace the query statement "SELECT * FROM BASE_DATA WHERE ELEMENT_1='VALUE_1'" with the statement "SELECT * FROM BASE_WHERE ELEMENT_1='VALUE_1' AND (ID NOT IN (SELECT ID FROM CHANGED_RECORDS)) UNION (SELECT * FROM CHANGED_RECORDS WHERE ELEMENT_1='VALUE_1')." It will be appreciated that in this example, the server application 108 has modified the original statement to include updates reflected in the changed records table 204.

The server application 108 further can be configured to generate a separate query for the deleted records table 206 and/or to further modify the modified query to include a statement for filtering out the deleted records. Returning to the above example, the server application 108 can replace the modified query with the statement "SELECT * FROM BASE_DATA WHERE ELEMENT_1='VALUE_1' AND (ID NOT IN (SELECT ID FROM CHANGED_RECORDS)) AND (ID NOT IN (SELECT ID FROM DELETED_RECORDS)) UNION (SELECT * FROM CHANGED_RECORDS WHERE ELEMENT_1='VALUE_1')." It therefore will be appreciated that in this example, the server application 108 has modified the query to reflect data stored in the changed records table 204 and the deleted records table 206, thereby producing results 118 that reflect data in the base data 114 and the changeset 120.

From operation 308, the method 300 proceeds to operation 310, wherein the server application 108 runs the modified query and provides the results obtained using the modified query to the entity that generated the operation 112. From operations 310 and 306, the method 300 proceeds to operation 312, wherein the server application 108 determines if the transaction between the device 110 and the server computer 102 has ended. If the server application 108 determines that the transaction between the device 110 and the server computer 102 has not ended, the method 300 returns to operation 302, wherein the server computer 102 waits for another operation 112 to be received from the device 110. If the server application 108 determines that the transaction between the device 110 and the server computer 102 has ended, the method 300 proceeds to operation 314.

At operation 314, the server application 108 commits the changes reflected by the changeset 120 to the base data 114.

As such, the base data 114 is updated to reflect the changes indicated in the changeset 120. As mentioned above, the server application 108 locks the base data 114 only while the changes reflected by the changeset 120 are applied to the base data 114. To avoid deadlocks however, the order of these locks must be the same on all concurrent operations. In some embodiments, this is accomplished as the changeset 120 contains all modifications and sorting of the modifications is done without regard to the original order of modifications. The server application 108 deletes any records 216 indicated as deleted in the deleted records table 206, and updates any records 208 corresponding to records 216 indicated as changed in the changed records table 204. The server application 108 stores the updated data at the database 116, and discards the changeset 120 and/or clears the contents of the changed records table 204 and/or the deleted records table 206. The method 300 ends at operation 316.

As explained above, embodiments of the concepts and technologies described herein allow the devices 110 to avoid performing cache maintenance and/or post-processing on query results, as the computations are performed at the server computer 102 by the server application 108. Additionally, because the changes are made to the changeset 120 instead of the base data 114, the duration of time during which the base data 114 is locked can be reduced relative to the duration of time during which the base data 114 may be locked if a device cache and/or post-processing operations are used. As such, performance of the database 116, the devices 110, and/or the server computer 102 can be improved over other approaches to reducing data locking.

Although not described above, one embodiment of the concepts and technologies described herein includes the selective use of local temporary tables and global temporary tables for storing the changeset 120, depending upon needs, desires, and/or preferences. Thus, in some embodiments, the changeset 120 is stored in global temporary tables, thereby allowing other devices and applications to access the change set 120 to allow a current view of the base data 114 as modified by the changeset 120.

According to some embodiments, the server application 108 only locks one table of the changeset 120 at any particular time. As such, in some embodiments only one of the updated records table 204 or the deleted records table 206 may be locked at any time. Thus, the base data 114 and one of the updated records table 204 or the deleted records table 206 will be unlocked at any time, unless the changes in the changeset are being committed to the base data 114. As mentioned above, in some embodiments the server application 108 generates a changeset 120 for each user and/or the changeset 120 includes local temporary tables instead of global temporary tables. As such, the tables of the changeset 120 are locked during updating, but because only one user has access to the tables of the changeset 120, the locking of the tables does not impact performance or scalability. Also, in some embodiments, the changes in the changeset 120 are stored as "deltas," thereby allowing multiple operations and/or updates to the same data without generating conflicts among the multiple entities submitting operations and/or updates.

Figure 4:
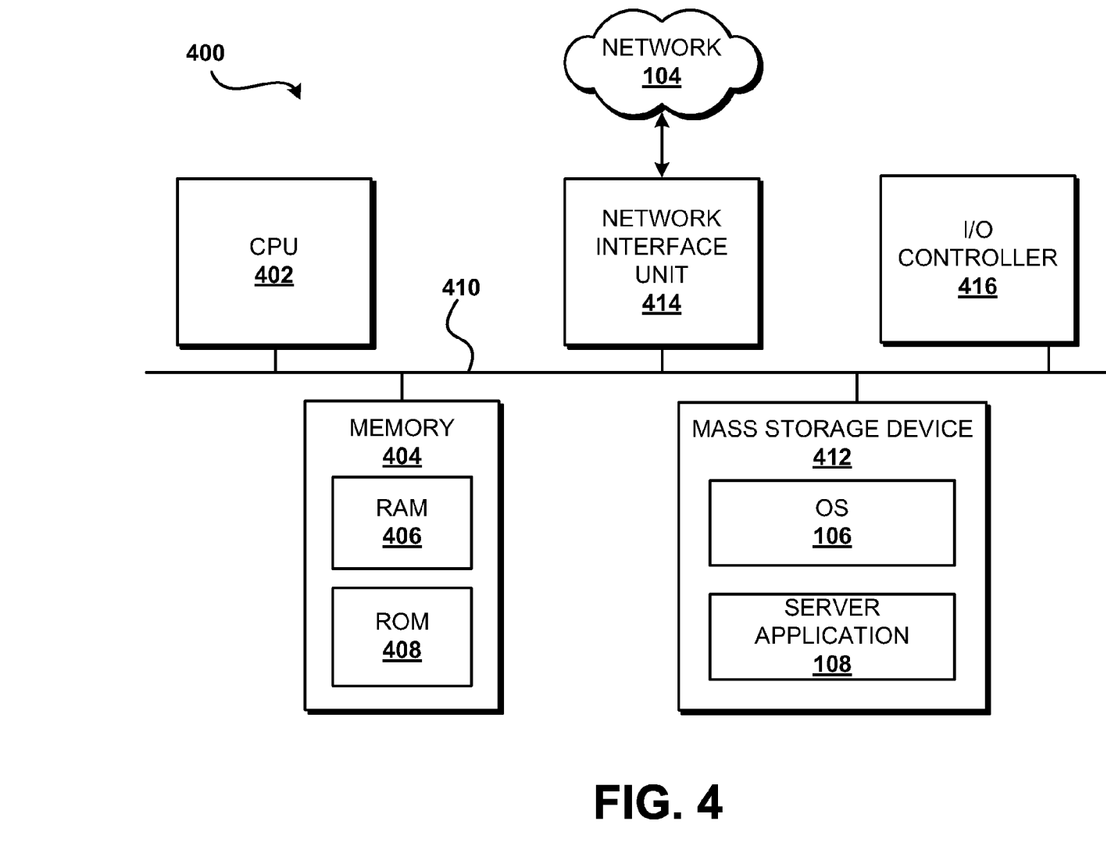
FIG. 4 is a computer architecture diagram illustrating an exemplary computer hardware and software architecture for a computing system capable of implementing aspects of the embodiments presented herein.

FIG. 4 illustrates an exemplary computer architecture 400 for a device capable of executing the software components described herein for reducing locking during database transactions. Thus, the computer architecture 400 illustrated in FIG. 4 illustrates an architecture for a server computer, a desktop computer, a netbook computer, a tablet computer, a laptop computer, a smart phone, and/or other computing devices. The computer architecture 400 may be utilized to execute any aspects of the software components presented herein.

The computer architecture 400 illustrated in FIG. 4 includes a central processing unit 402 ("CPU"), a system memory 404, including a random access memory 406 ("RAM") and a read-only memory ("ROM") 408, and a system bus 410 that couples the memory 404 to the CPU 402. A basic input/output system containing the basic routines that help to transfer information between elements within the computer architecture 400, such as during startup, is stored in the ROM 408. The computer architecture 400 further includes a mass storage device 412 for storing the operating system 106 and the server application 108. Although not shown in FIG. 4, the mass storage device 412 also can be configured to store the base data 114 and/or the changeset 120, if desired.

The mass storage device 412 is connected to the CPU 402 through a mass storage controller (not shown) connected to the bus 410. The mass storage device 412 and its associated computer-readable media provide non-volatile storage for the computer architecture 400. Although the description of computer-readable media contained herein refers to a mass storage device, such as a hard disk or CD-ROM drive, it should be appreciated by those skilled in the art that computer-readable media can be any available computer storage media that can be accessed by the computer architecture 400.

By way of example, and not limitation, computer-readable storage media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 400. For purposes of this specification and the claims, the phrase "computer-readable storage medium" and variations thereof, does not include waves, signals, and/or other transitory and/or intangible communication media.

According to various embodiments, the computer architecture 400 may operate in a networked environment using logical connections to remote computers through a network such as the network 104. The computer architecture 400 may connect to the network 104 through a network interface unit 414 connected to the bus 410. It should be appreciated that the network interface unit 414 also may be utilized to connect to other types of networks and remote computer systems, for example, one or more devices 110, the database 116, and/or other nodes or devices. The computer architecture 400 also may include an input/output controller 416 for receiving and processing input from a number of other devices, including a keyboard, mouse, or electronic stylus (not shown in FIG. 4). Similarly, the input/output controller 416 may provide output to a display screen, a printer, or other type of output device (also not shown in FIG. 4).

It should be appreciated that the software components described herein may, when loaded into the CPU 402 and executed, transform the CPU 402 and the overall computer architecture 400 from a general-purpose computing system into a special-purpose computing system customized to facilitate the functionality presented herein. The CPU 402 may be constructed from any number of transistors or other discrete circuit elements, which may individually or collectively assume any number of states. More specifically, the CPU 402 may operate as a finite-state machine, in response to executable instructions contained within the software modules disclosed herein. These computer-executable instructions may transform the CPU 402 by specifying how the CPU 402 transitions between states, thereby transforming the transistors or other discrete hardware elements constituting the CPU 402.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 400 in order to store and execute the software components presented herein. It also should be appreciated that the computer architecture 400 may include other types of computing devices, including hand-held computers, embedded computer systems, personal digital assistants, and other types of computing devices known to those skilled in the art. It is also contemplated that the computer architecture 400 may not include all of the components shown in FIG. 4, may include other components that are not explicitly shown in FIG. 4, or may utilize an architecture completely different than that shown in FIG. 4.

Based on the foregoing, it should be appreciated that technologies for reducing locking during database transactions have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method for updating base data in a database, the computer-implemented method comprising performing computer-implemented operations for:
    receiving, at a server executing a server application, a plurality of operations from a plurality of corresponding devices, each of the operations comprising information for modifying the base data in the database;
    generating, by the server, a changeset for each particular corresponding device being private to and visible only to a respective corresponding device based upon each of the plurality of operations, the changeset indicating changes to be made to the base data in the database, wherein the changeset comprises two tables including a changed record table and a deleted record table, at least one of the two tables storing data indicating at least one of a record of the base data changed by one of the plurality of operations or a record of the base data deleted by one of the plurality of operations;
    storing, by the server, the changeset in the database;
    before updating the base data according to changes indicated in the changeset, receiving a query from at least one requesting device of the plurality of devices, the query comprising a request to read the base data from the database;
    generating, by the server, a modified query comprising the query and a changeset query for reading the data stored in at least one of the changed record table or the deleted record table, the changeset query including a select statement for data from the base data of the query and one or more statements for data from the changeset;
    returning, by the server, results satisfying the modified query to the at least one requesting device of the plurality of devices; and
    updating, by the server, the base data according to the changes indicated in the changeset, in response to determining that a transaction between the device and the server computer has ended.

2. The method of claim 1, wherein the changeset comprises a changed record table storing data indicating a record of the base data changed by one of the plurality of operations.

3. The method of claim 2, wherein the record of the base data changed by one of the plurality of operations comprises a record deleted by one of the plurality of operations.

4. The method of claim 2, wherein updating the base data comprises modifying the record of the base data indicated by the data stored in the changed record table.

5. The method of claim 2, wherein a layout of the changed data table is the same as a layout of a base data table storing the base data.

6. The method of claim 1, further comprising executing the query and the changeset query to obtain the results satisfying the modified query.

7. The method of claim 1, wherein updating the base data comprises at least one of
    changing the record of the base data according to the data stored in the changed record table, or
    deleting the record of the base data according to the data stored in the deleted record table.

8. The method of claim 1, wherein updating the base data comprises:
    locking the base data for updating; and
    updating the base data in accordance with the changeset while the base data is locked for updating.

9. The method of claim 8, wherein updating the base data further comprises:
upon completing updating of the base data, unlocking the base data; and
discarding the changeset.

10. A computer-readable storage medium having computer readable instructions stored thereupon that, when executed by a computer, cause the computer to:
receive a plurality of operations from a plurality of corresponding devices, each of the operations comprising information for modifying the base data in the database;
generate a changeset for each particular corresponding device being private to and visible only to a respective corresponding device based upon each of the plurality of operations, the changeset indicating changes to be made to the base data in the database, wherein the changeset comprises two tables including a changed record table and a deleted record table, at least one of the two tables storing data indicating at least one of a record of the base data changed by one of the plurality of operations or a record of the base data deleted by one of the plurality of operations;
store the changeset in the database;
before updating the base data according to changes indicated in the changeset, receive a query from at least one requesting device of the plurality of devices, the query comprising a request to read the base data from the database;
generate a modified query comprising the query and a changeset query for reading the data stored in at least one of the changed record table or the deleted record table, the changeset query including a select statement for data from the base data of the query and one or more statements for data from the changeset;
return results satisfying the modified query to the at least one requesting device of the plurality of devices; and
update the base data according to the changes indicated in the changeset, in response to determining that a transaction between the device and the computer has ended.

11. The computer-readable storage medium of claim 10, further comprising instructions that, when executed by the computer, cause the computer to:
execute the query and the changeset query to obtain the results satisfying the modified query.

12. The computer-readable storage medium of claim 11, wherein updating the base data comprises at least one of
changing the record of the base data according to the data stored in the changed record table, or
deleting the record of the base data according to the data stored in the deleted record table.

13. The computer-readable storage medium of claim 11, wherein updating the base data comprises:
locking the base data for updating;
updating the base data in accordance the changeset while the base data is locked for updating;
upon completing updating of the base data, unlocking the base data; and
discarding the changeset.

14. A computer-implemented method for updating base data in a database, the computer-implemented method comprising performing computer-implemented operations for:
receiving, at a server executing a server application, a plurality of operations from a plurality of corresponding devices at a server computer, each of the operations comprising information for modifying the base data in the database;
generating, by the server, a changeset for each particular corresponding device being private to and visible only to a respective corresponding device based upon each of the plurality of operations, the changeset comprising two tables including a changed record table and a deleted record table, at least one of the two tables storing data indicating at least one of a record of the base data changed by one of the plurality of operations or a record of the base data deleted by one of the plurality of operations;
storing, by the server, the changeset in the database;
receiving, by the server, a query from the device, the query comprising a request to read the base data from the database;
generating, by the server, a modified query comprising the query and a changeset query for reading the data stored in at least one of the changed record table or the deleted record table;
executing, by the server, the query and the changeset query to obtain results satisfying the query;
determining, by the server, if the transaction between the device and the server computer has ended; and
updating, by the server, the base data according to the changes indicated in the changeset, in response to determining that a transaction between the device and the server computer has ended.

15. The method of claim 1, wherein each of the multiple changesets is stored as a global temporary table to enable viewing of the base data as modified by one or more of the multiple changesets.

* * * * *